United States Patent
Ishikawa et al.

(10) Patent No.: US 8,146,571 B2
(45) Date of Patent: Apr. 3, 2012

(54) GAS ENGINE AND GAS-ENGINE-MOUNTED WORKING MACHINE

(75) Inventors: Takeshi Ishikawa, Wako (JP); Kazuhisa Fujiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 12/273,059

(22) Filed: Nov. 18, 2008

(65) Prior Publication Data

US 2009/0126701 A1    May 21, 2009

(30) Foreign Application Priority Data

Nov. 21, 2007  (JP) ................ 2007-302205

(51) Int. Cl.
*F02G 5/00*    (2006.01)
(52) U.S. Cl. ........................................... 123/557
(58) Field of Classification Search .......... 123/519, 123/557, 1 A, 195 A, 543–547, 575
See application file for complete search history.

(56) References Cited

U.S. PATENT DOCUMENTS

| 5,542,398 A | * | 8/1996 | Marcon | 123/527 |
| 5,606,944 A | * | 3/1997 | Kurihara | 123/90.31 |
| 5,896,847 A | * | 4/1999 | Usuki | 123/557 |
| 7,424,886 B1 | * | 9/2008 | Herzer | 123/557 |
| 2002/0100459 A1 | * | 8/2002 | Lahti et al. | 123/547 |

FOREIGN PATENT DOCUMENTS

| JP | 62 020668 A | 1/1987 |
| JP | 04 103864 A | 4/1992 |
| JP | 05-141314 A | 6/1993 |
| JP | 06-066207 A | 3/1994 |
| JP | 10-122056 A | 5/1998 |
| JP | 2005-090445 A | 4/2005 |

* cited by examiner

*Primary Examiner* — Stephen K Cronin
*Assistant Examiner* — Sizo Vilakazi
(74) *Attorney, Agent, or Firm* — Arent Fox LLP

(57) ABSTRACT

A gas engine is driven by fuel gas supplied from a cassette gas canister, and includes a vaporizer device provided between a cylinder block and a muffler. The vaporizer device vaporizes liquid fuel gas, led out from the cassette gas canister, using heat of exhaust gas discharged from the cylinder block.

9 Claims, 8 Drawing Sheets

GAS ENGINE AND GAS-ENGINE-MOUNTED WORKING MACHINE

CROSS-REFERENCE TO RELATED APPLICATION

This application claims the priority of Japanese Application No. 2007-302205, filed Nov. 21, 2007.

FIELD OF THE INVENTION

The present invention relates to gas engines supplied with fuel from a cassette gas canister, and working machines having such a gas engine mounted thereon.

BACKGROUND OF THE INVENTION

Among the conventionally-known working machines are ones which include a gas engine mounted on the machine body, a cassette gas canister storing therein liquid fuel gas to be supplied to the gas engine, and a vaporizer device for vaporizing the liquid fuel gas led out from the cassette gas canister. One example of such working machines is disclosed in Japanese Patent Application Laid-Open Publication No. HEI-6-66207 (JP 06-066207 A).

In the gas-engine-mounted working machine disclosed in JP 06-066207 A, the vaporizer device is mounted on a cylinder of the engine so that the liquid fuel gas, led out from the canister, can be vaporized by the vaporizer device using heat of the cylinder.

However, with the vaporizer device in the disclosed gas-engine-mounted working machine, which uses only the heat of the engine cylinder, it is difficult to effectively accumulate sufficient heat for vaporizing the liquid fuel gas, and thus, an improvement has to be made to enhance the liquid-fuel-gas vaporizing performance.

SUMMARY OF THE INVENTION

In view of the foregoing prior art problems, it is an object of the present invention to provide an improved gas engine and an improved gas-engine-mounted working machine which can achieve an enhanced liquid-fuel-gas vaporizing performance.

In order to accomplish the above-mentioned object, the present invention provides an improved gas engine supplied with fuel gas from a cassette gas canister, which comprises a vaporizer device provided between the cylinder and the muffler for vaporizing liquid fuel gas led out from the cassette gas canister, the gas engine being driven by the fuel gas vaporized by the vaporizer device.

Because the vaporizer device is provided between the cylinder and the muffler, heat of the cylinder and muffler is transmitted to the vaporizer device, so that heat can be efficiently accumulated in the vaporizer device. Thus, the liquid fuel gas can be vaporized using the heat efficiently accumulated in the bracket member, which thereby achieves an enhanced liquid-fuel-gas vaporizing performance. As a result, even when an ambient temperature is low, the present invention allows the liquid fuel gas to be vaporized efficiently in a short time following activation of the gas engine, thereby achieving an enhanced starting performance.

Preferably, the vaporizer device includes a bracket member provided between the cylinder and the muffler and having an exhaust gas opening for leading exhaust gas from an interior of the cylinder to the muffler, and the bracket member has a fuel gas flow passage for leading liquid fuel gas, led out from the cassette gas canister, to the cylinder. The exhaust gas discharged from the cylinder is led to the muffler via the exhaust gas opening, and thus, the present invention can efficiently accumulate the heat of the exhaust gas in the bracket member as the exhaust gas passes through the exhaust gas opening. Further, by the provision, on the bracket member, of the fuel gas flow passage for leading the liquid fuel gas from the gas canister to the cylinder of the gas engine, the liquid fuel gas can be vaporized efficiently using the heat accumulated in the bracket member, which thereby achieves an even further enhanced liquid-fuel-gas vaporizing performance.

Preferably, of the bracket member, a section defining and surrounding the exhaust gas opening has a greater thickness than the remaining section of the bracket member. Because the section defining and surrounding the exhaust gas opening has such an increased thickness, it can have an increased volume, so that a heat absorption rate of the section defining and surrounding the exhaust gas opening can be increased and the thus-increased heat absorption rate allows the heat of the exhaust gas to be accumulated in the bracket member with an even further enhanced efficiency. As a result, the present invention achieves an even further enhanced liquid-fuel-gas vaporizing performance.

Preferably, the gas engine of the present invention further comprises a regulator mounted to the bracket member for keeping the fuel gas, vaporized by the vaporizer device at a predetermined constant gas pressure. Thus, the fuel gas, vaporized by the vaporizer device and sent to the regulator, can be kept in a good vaporized condition in the regulator. As a result, the present invention achieves an even further enhanced liquid-fuel-gas vaporizing performance.

Preferably, the fuel gas flow passage is provided in a configuration meandering along a surface of the bracket member. By virtue of such a meandering configuration of the fuel gas flow passage, the fuel gas flow passage can have a sufficient overall length, so that it takes a relatively long time for the fuel gas to be led from a lead-in position to a lead-out position of the fuel gas flow passage. Thus, the liquid fuel gas can be vaporized efficiently using the heat of the exhaust gas, which thereby achieves an even further enhanced liquid-fuel-gas vaporizing performance.

According to another aspect of the present invention, there is provided an improved gas-engine-mounted working machine which is provided with the aforementioned improved gas engine. With this working machine too, the liquid-fuel-gas vaporizing performance can be significantly enhanced using the heat accumulated in the vaporizer device. As a result, even when an ambient temperature is low, the present invention allows the liquid fuel gas to be vaporized efficiently in a short time following activation of the gas engine, thereby achieving an enhanced starting performance under the lower temperature environment.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

In the following description, the terms "front", "rear", "left" and "right" are used to refer to directions as viewed from a human operator. Whereas a walk-behind cultivating machine will hereinafter be described as a preferred embodiment of a gas-engine-mounted working machine of the present invention, the present invention is not limited to such a walk-behind cultivating machine.

Figure 1:
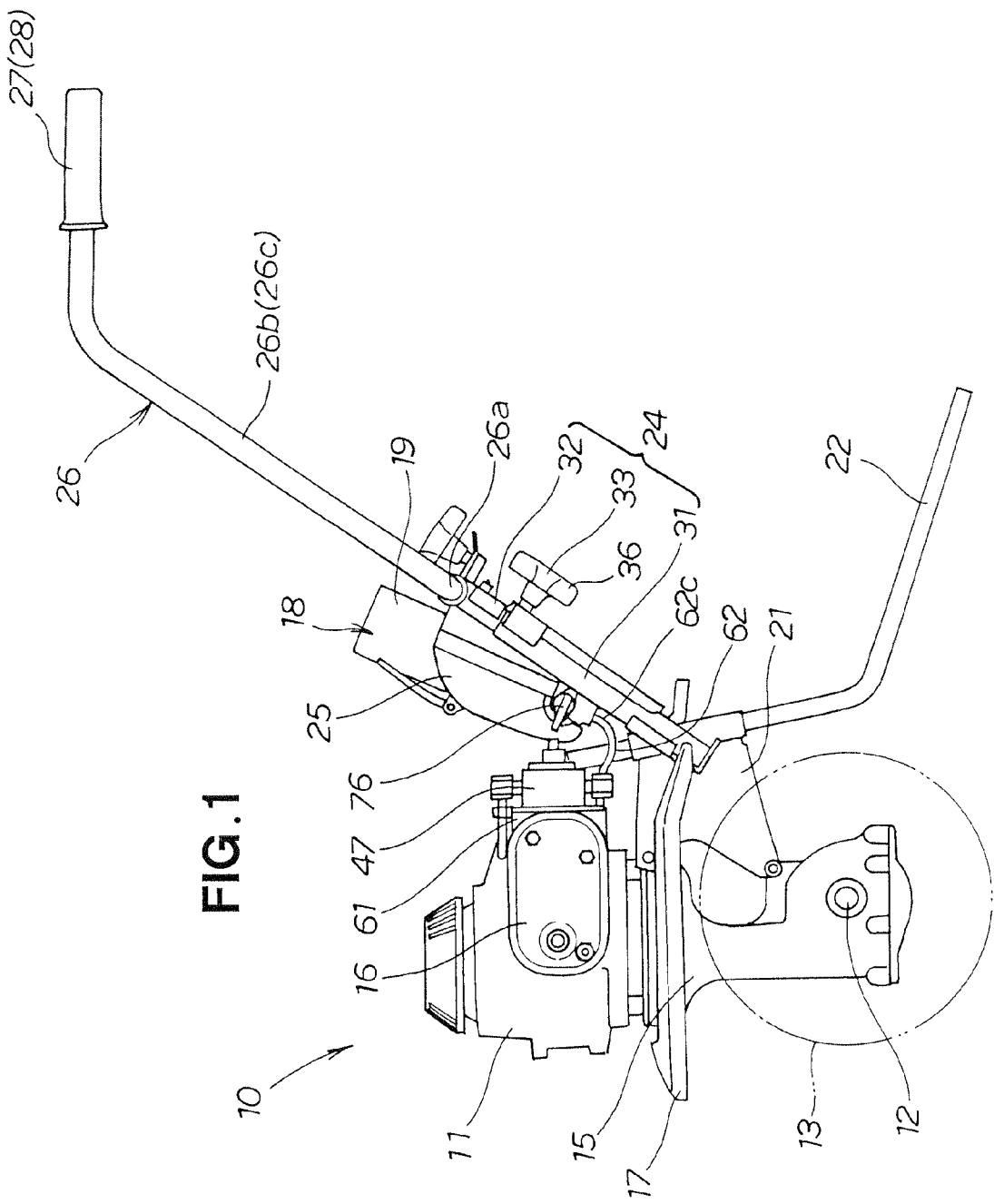
FIG. 1 is a side view showing an embodiment of a gas-engine-mounted working machine of the present invention.

FIG. 1 is a side view according to an embodiment of the gas-engine-mounted working machine 10 of the present invention. The gas-engine-mounted working machine 10 illustrated here is a walk-behind cultivating machine where driving power of a gas engine 11 is transmitted to a cultivating shaft 12 to rotate the cultivating shaft 12 so that it can travel while cultivating the soil by means of a plurality of cultivating claws 13.

The gas-engine-mounted working machine 10 includes a gas engine 11 mounted on an upper end portion of a machine body 15, a fender 17 disposed beneath the gas engine 11 and muffler 16 disposed to the left of the gas engine 11, and the plurality of cultivating claws 13 disposed beneath the fender 17.

The cultivating shaft 12 is a rotation shaft extending horizontally in a width direction of the machine body. The fender 17 is a cover for preventing dispersion of the soil. The gas engine 11 is driven by liquid fuel gas led out from a later-described cassette gas canister 18.

In the instant embodiment, the cassette gas canister 18 is a commercially-available gas canister where the liquid fuel gas, preferably liquefied butane (hereinafter referred to as "liquid fuel gas") consisting primarily of butane, is filled in its container 19.

The gas-engine-mounted working machine 10 further includes a support bracket 21 fixed to the machine body 15, a resistance bar 22 fixed to the support bracket 21, a handle column 24 extending rearwardly and upwardly from the support bracket 21, a gas canister retainer assembly 25 fixed to the handle column 24, the gas canister 18 mounted to the gas canister retainer assembly 25, and an operating handle 26 mounted to an upper end portion of the handle column 24. The resistance bar 22 is a member for adjusting a soil cultivating depth of the plurality of cultivating claws 13.

The handle column 24 includes a fixed column 31 fixed to a rear end portion of the support bracket 21, a liftable column 32 vertically movably mounted to the fixed column 31, and a retainer 33 for retaining the liftable column 32 at a desired position. The liftable column 32 is allowed to move vertically by a retaining screw 36 of the retainer 33 being removed.

The operating handle 26 is a cylindrical member that has a substantially U overall shape as viewed from the front. The operating handle 26 has an intermediate, horizontal handle section 26a pivotably mounted to the upper end portion of the handle column 24, left and right handle sections 26b and 26c extending rearwardly and upwardly from the left and right ends, respectively, of the intermediate, horizontal handle section 26a, and left and right grips 27 and 28 provided on respective distal end portions of the left and right handle sections 26b and 26c.

Figure 2:
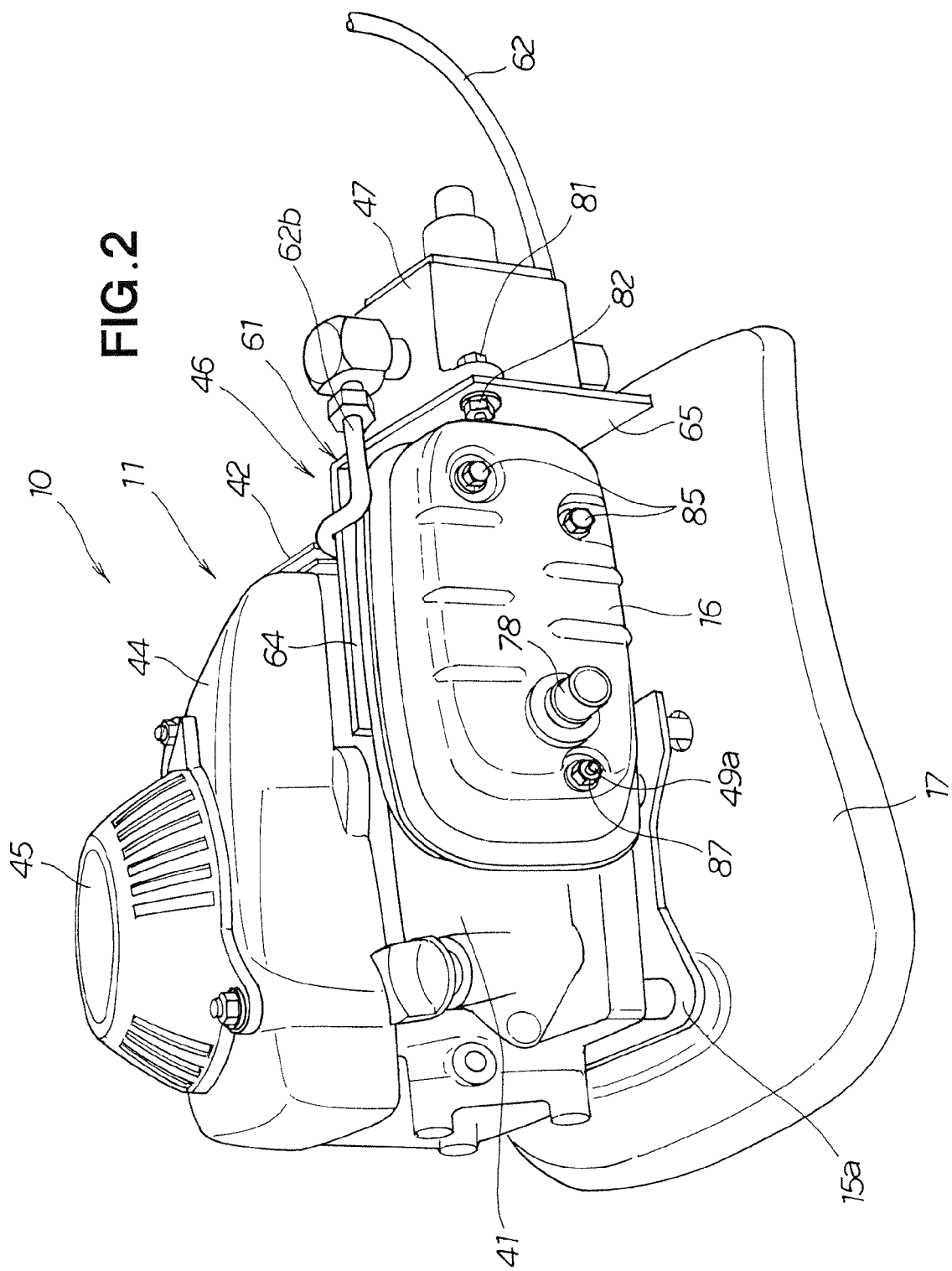
FIG. 2 is a perspective view of a gas engine employed in the gas-engine-mounted working machine of the present invention.
Figure 3:
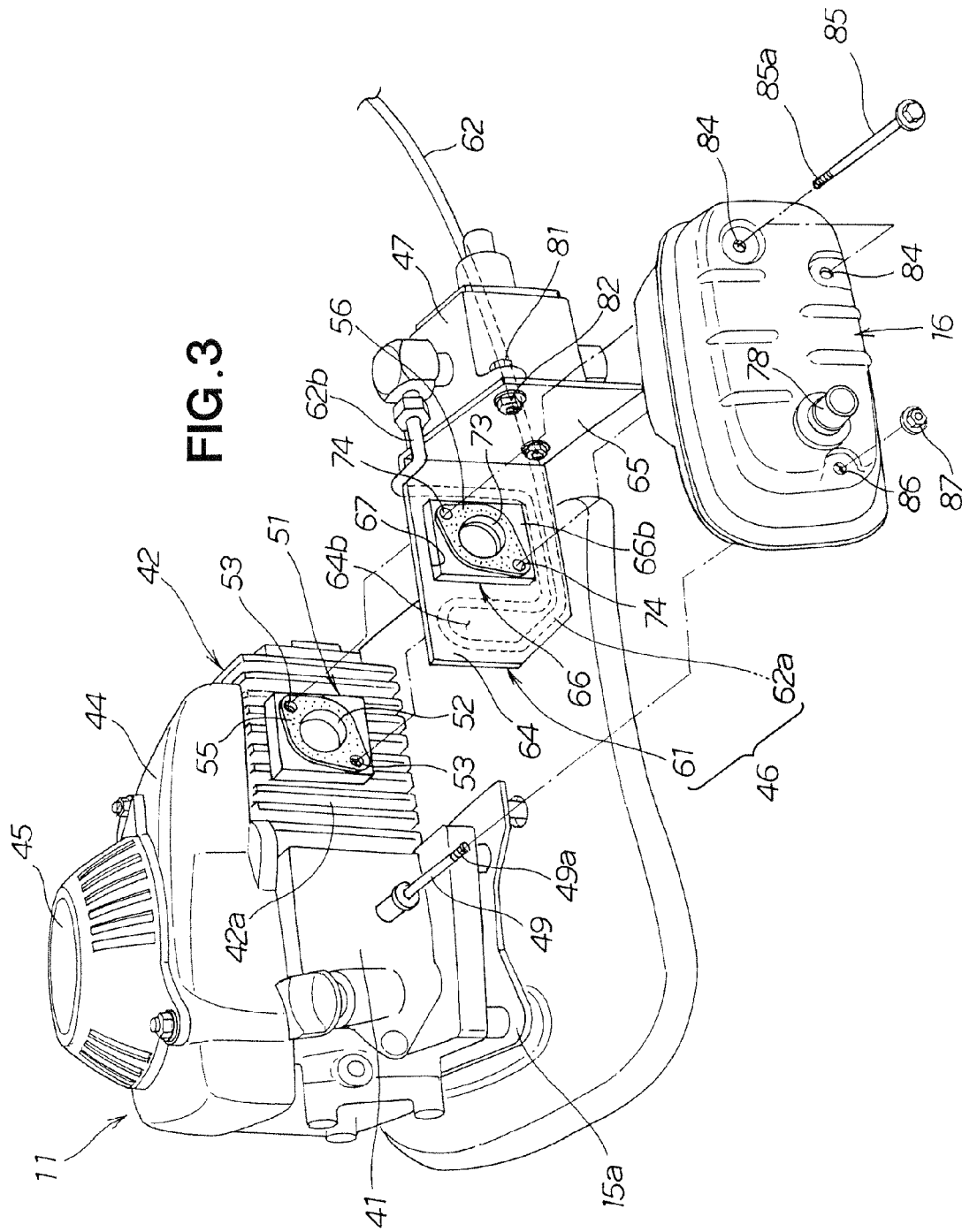
FIG. 3 is an exploded perspective view of the gas engine of FIG. 2.
Figure 4:
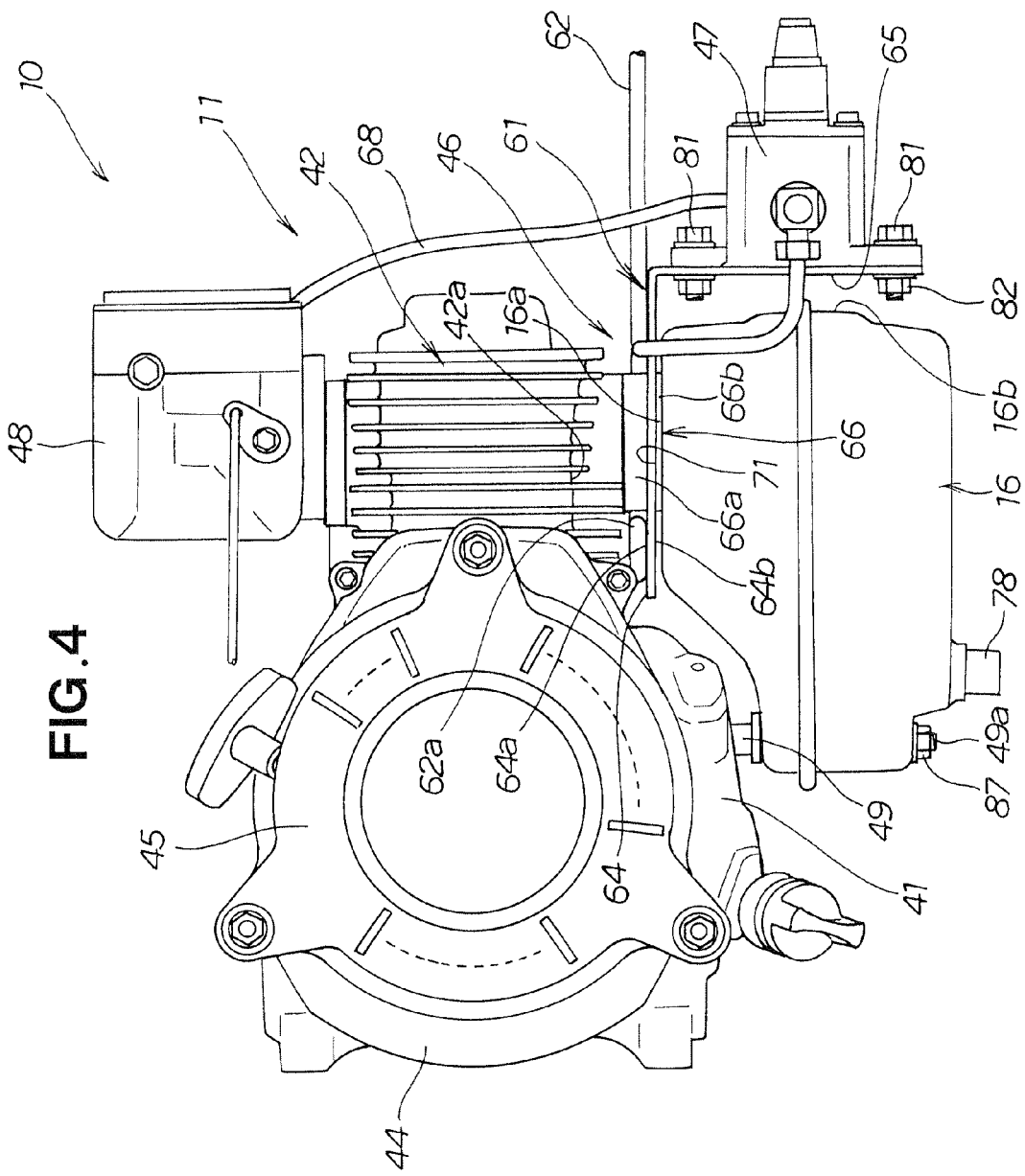
FIG. 4 is a plan view of the gas engine employed in the gas-engine-mounted working machine of the present invention.

FIG. 2 is a perspective view of the gas engine 11 employed in the gas-engine-mounted working machine 10, FIG. 3 is an exploded perspective view of the gas engine 11 and FIG. 4 is a plan view of the gas engine 11 employed in the gas-engine-mounted working machine 10.

The gas engine 11 includes a crankcase 41 mounted on an upper end portion 15a of the machine body 15, a cylinder block (engine cylinder) 42, and a pulley cover 45 mounted on the crankcase 41 via an engine cover 44.

The gas engine 11 further includes a vaporizer device 46 provided between the cylinder block 42 and the muffler 16. The vaporizer device 46 is provided with a regulator 47, and, although not visible in FIG. 2, a mixer 48 (see FIG. 4) is disposed on a right side wall portion of the vaporizer device 46.

The crankcase 41 has a stud 49 provided on its left side wall portion. The stud 49 is a member for fixing the muffler 16 to the crankcase 41. The cylinder block 42 has an exhaust gas ejection section 51 on its left side wall portion 42a.

The exhaust gas ejection section 51 has an exhaust gas port 52 communicating with the interior of the cylinder block 42, and screw holes 53 are formed in diagonally-opposed corner portions of the exhaust gas ejection section 51. The exhaust gas port 52 is an opening for discharging exhaust gas from the interior of the cylinder.

The vaporizer device 46 is connected to the exhaust gas ejection section 51 via a first gasket 55 (see FIG. 3). The vaporizer device 46 includes a bracket member 61, and a vaporizing fuel gas flow passage 62a provided on the bracket member 61. The vaporizer device 46 is a device for vaporizing the liquid fuel gas led out form the cassette gas canister 18.

The muffler 16 is connected to the vaporizer device 46 via a second gasket 56 (see FIG. 3). A pair of bolts 85 is inserted through first and second mounting holes 84 of the muffler 16 and through-holes 74 of a muffler mounting section 66, and threaded portions 85 projecting out of the through-holes 74 are screwed to corresponding screw holes 53 of the exhaust gas ejection section 51.

Further, the stud 49 of the crankcase 41 is fitted in a mounting hole 86 of the muffler 16, and a nut 87 is screwed to a threaded portion 49a of the stud 49 projecting out of the muffler 16. Thus, the muffler 16 is attached to the respective left side wall portions of the crankcase 41 and cylinder block 42 by means of the two bolts 85 and one stud 49.

The regulator 47 is a device for keeping the fuel gas, vaporized by the vaporizer device 46, at a predetermined constant gas pressure. Thus, the fuel gas, vaporized by the vaporizer device 46, is sent to the mixer 48 while being kept at the predetermined constant gas pressure by the regulator 47.

The mixer 48 is a device that mixes air, introduced via a not-shown air cleaner, with the fuel gas vaporized by the vaporizer device 46 and passes the air-fuel mixture into the cylinder of the gas engine 11.

Figure 5:
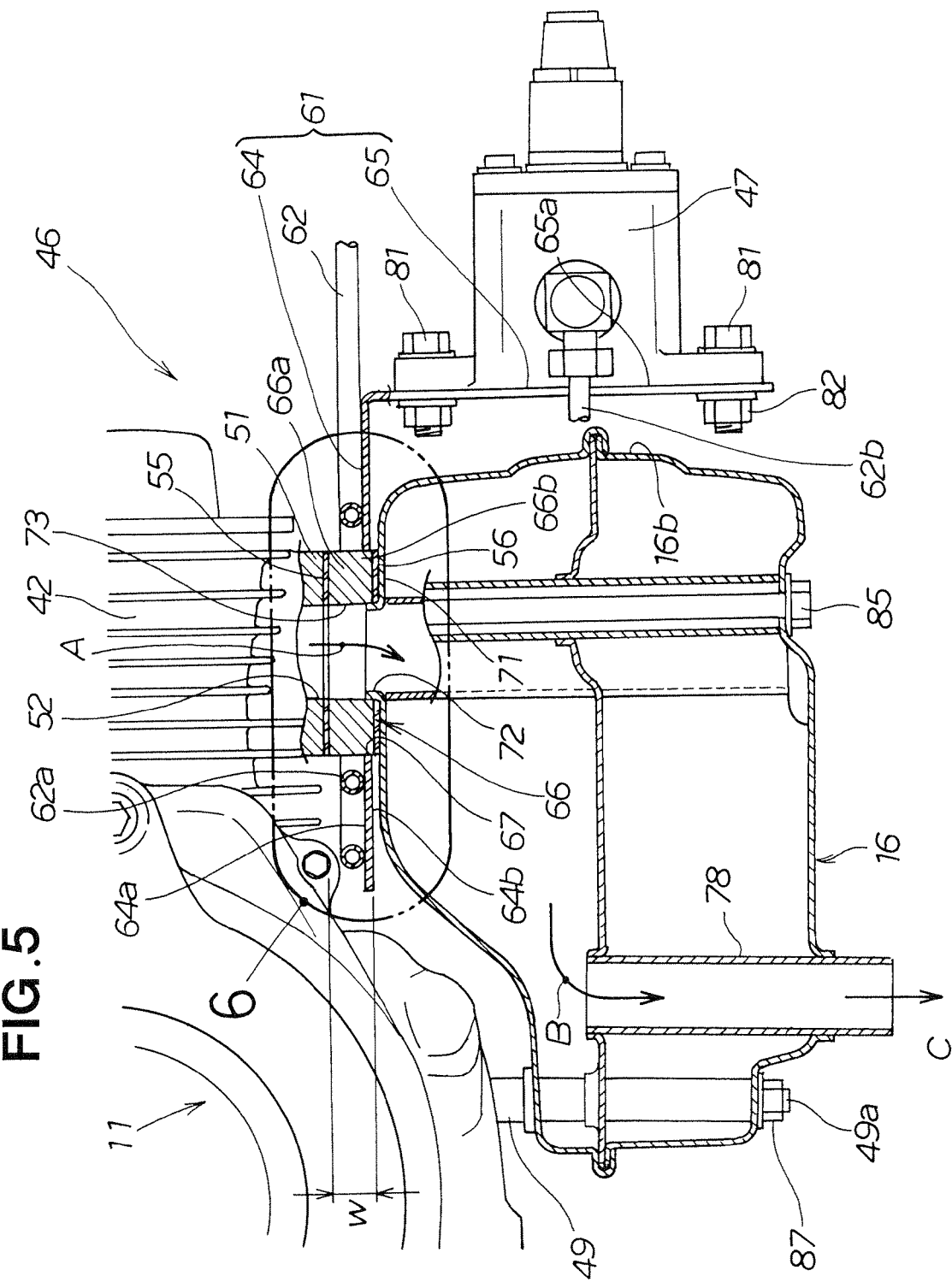
FIG. 5 is a sectional view showing a vaporizer device employed in the gas-engine-mounted working machine of the present invention.
Figure 6:
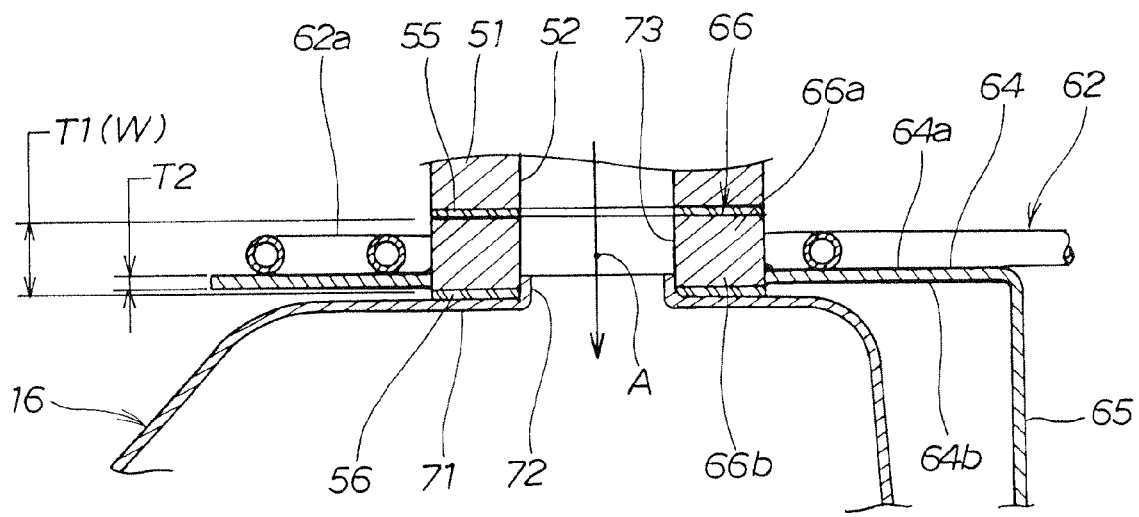
FIG. 6 is an enlarged view of the vaporizer device of FIG. 5.

FIG. 5 is a sectional view showing the vaporizer device 46 employed in the instant embodiment, and FIG. 6 is an enlarged view of the vaporizer device 46 of FIG. 5. The bracket member 61 has a vaporizing plate section 64 oriented in a front-rear direction of the machine 10, a mounting plate section 65 bent laterally outward from the rear end of the vaporizing plate section 64, and a muffler mounting section 66 provided on the vaporizing plate section 64. The bracket member 61 has a generally L shape as viewed in plan, which comprises the vaporizing plate section 64 and mounting plate section 65 each having a generally rectangular shape (see also FIG. 3).

The vaporizing plate section 64 is disposed between the left side wall portion 42a of the cylinder block 42 and an inner side wall portion 16a (see FIG. 4) of the muffler 16, and it has a mounting opening 67 formed in a substantial central region thereof. The muffler mounting section 66 is fitted in the mounting opening 67 and secured by welding to the vaporizing plate section 64.

The muffler mounting section 66 has a portion 66a (FIG. 4) opposed to the exhaust gas ejection section 51, and this portion 66a bulges from an inner side wall portion 64a of the vaporizing plate section 64 toward the exhaust gas ejection section 51. The muffler mounting section 66 also has a portion 66b opposed to a mounting section 71 of the muffler 16, and this portion 66b is formed generally in flush with an outer side surface 64b of the vaporizing plate section 64.

Thus, the muffler mounting section 66 has a thickness T1 greater than a thickness T2 of the vaporizing plate section (i.e., remaining section of the bracket member 61) 64, as shown in FIG. 6. The thickness T1 of the muffler mounting section 66 is equal to a width W (see FIG. 5) of a vaporizing section of the vaporizer device 46.

The muffler mounting section 66 has an exhaust gas opening 73 defined therein and communicating with the exhaust port 52 of the exhaust gas ejection section 51, and the through-holes 74 (FIG. 3) are formed in a rear upper corner portion and front lower corner portion, adjacent to the exhaust port 73, of the muffler mounting section 66.

The exhaust gas opening 73 communicates with the interior of the cylinder 42 via the exhaust port 52 of the exhaust gas ejection section 51 and communicates with the interior of the muffler 16 via an exhaust gas lead-in port 72. Thus, the exhaust gas within the cylinder is led into the muffler 16 via the exhaust port 52, exhaust gas opening 73 and exhaust gas lead-in port 72 as indicated by arrow A.

The exhaust gas led into the muffler 16 is then directed into an exhaust pipe 78 as indicated by arrow B in FIG. 5, and the exhaust gas thus directed into the exhaust pipe 78 is discharged to the outside as indicated by arrow C. Namely, the exhaust gas opening 73 is an opening which is provided between the cylinder of the gas engine 11 and the muffler 16 for leading the exhaust gas from the interior of the cylinder to the muffler 16.

By thus leading the exhaust gas from the cylinder to the muffler 16 via the exhaust gas opening 73, the instant embodiment can efficiently accumulate heat of the exhaust gas in the bracket member 61.

Further, because the muffler mounting section 66 defining and surrounding the opening 73 has an increased thickness T1, it can have an increased volume, so that a heat absorption rate of the muffler mounting section 66 can be increased and the thus-increased heat absorption rate allows the heat of the exhaust gas to be accumulated in the bracket member 61 with an even further enhanced efficiency.

In the instant embodiment, the vaporizing fuel gas flow passage 62a is brazed to the inner side wall portion 64a of the vaporizing plate section 64, having the muffler mounting section 66 mounted thereto, so as to surround the muffler mounting section 66. As seen in FIG. 3, the vaporizing fuel gas flow passage 62a is located close to a downstream end portion 62b of a first fuel gas flow passage 62.

Figure 7:
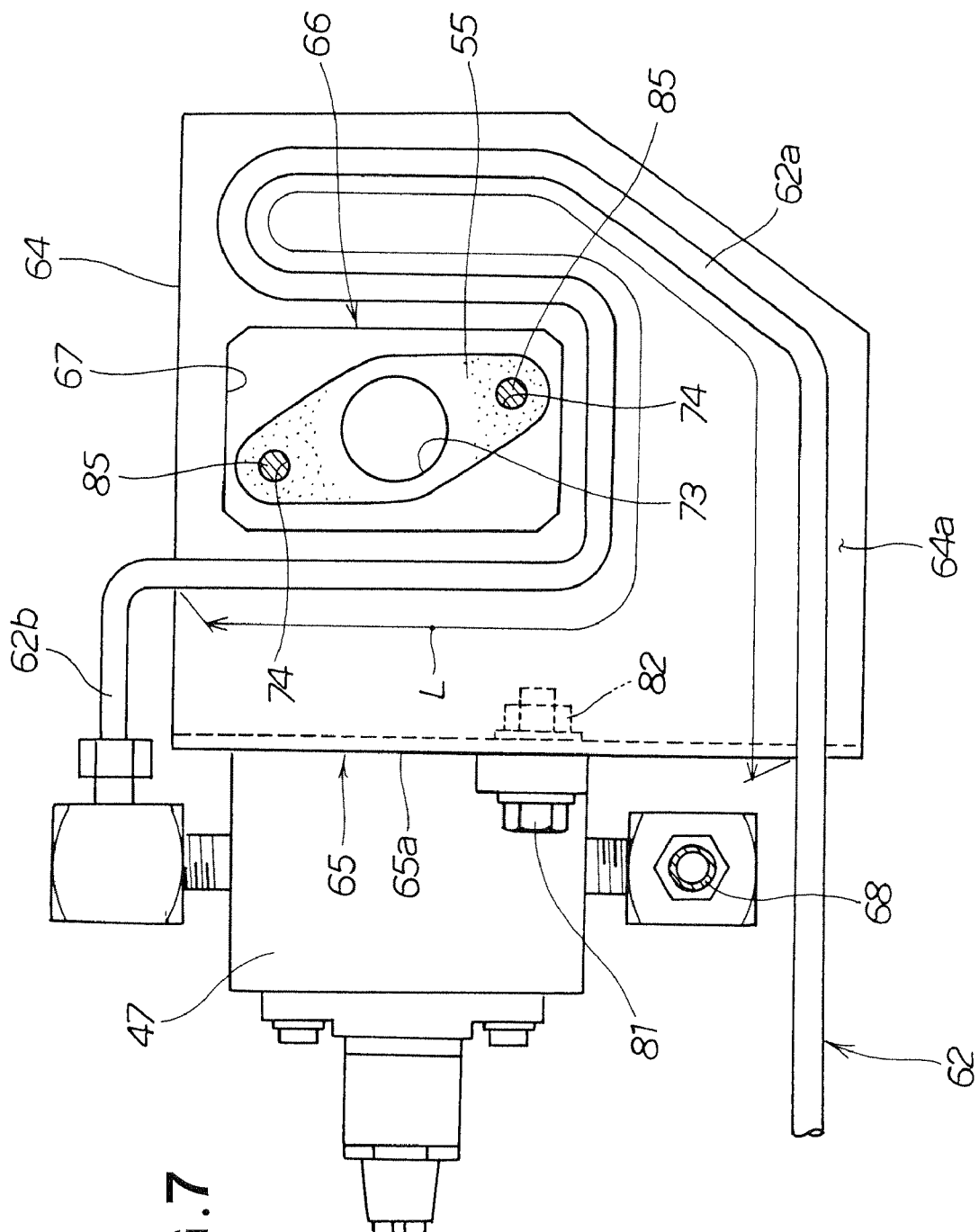
FIG. 7 is a right sectional side view of the vaporizer device in the gas-engine-mounted working machine of the present invention.

FIG. 7 is a right sectional side view of the vaporizer device 46. The vaporizing fuel gas flow passage 62a is brazed to the inner side wall portion 64a of the vaporizing plate section 64 in a shape or configuration meandering along a surface of the inner side wall portion 64a. By being formed in the meandering configuration, the vaporizing fuel gas flow passage 62a can have a sufficient overall length L, so that the vaporizing fuel gas flow passage 62a can contact the inner side wall portion 64a over a considerably great area. Therefore, the vaporizer device 46 may have a reduced width W (see FIG. 5), and thus, the vaporizer device 46 can be disposed in a relatively small space between the cylinder block 42 and the muffler 16 as seen in FIG. 5. As a consequence, the vaporizer device 46 can be provided without sacrificing desired compactization of the gas engine 11.

By providing the vaporizer device 46 in a relatively small space between the cylinder block 42 and the muffler 16 as noted above, the instant embodiment can efficiently transmit heat of the cylinder block 42 and muffler 16 to the vaporizer device 46 (more specifically, to the muffler mounting section 66, vaporizing plate section 64 and vaporizing fuel gas flow passage 62a). By thus transmitting the heat of the cylinder block 42 and muffler 16 to the vaporizer device 46, the vaporizer device 46 can accumulate therein sufficient heat with an enhanced efficiency.

Further, by leading the exhaust gas from the interior of the cylinder to the muffler 16 via the exhaust gas opening 73 as noted above, the instant embodiment can efficiently accumulate the heat of the exhaust gas in the bracket member 61 as the exhaust gas passes through the exhaust gas opening 73.

In addition, with the increased thickness T1 of the muffler mounting section 66, the heat absorption rate of the muffler mounting section 66 can be enhanced, so that the heat of the exhaust gas can be accumulated in the bracket member 61 even more efficiently.

Referring back to FIG. 1, the first fuel gas flow passage 62 is a flow passage for sending the liquid fuel gas, led out from the cassette gas canister 18, to the gas engine 11. More specifically, the first fuel gas flow passage 62 is connected at its upstream end portion 62c to the cassette gas canister 18 via an opening/closing valve 76 and connected at the downstream end portion 62b (see FIG. 3) to the regulator 47.

Namely, the liquid fuel gas led out from the cassette gas canister 18 is sent, via the first fuel gas flow passage 62, to the gas engine 11 (more specifically, to the regulator 47). Thus, the liquid fuel gas can be vaporized using the heat efficiently accumulated in the bracket member 61, which thereby achieves an enhanced liquid-fuel-gas vaporizing performance.

The mounting plate section 65 of the bracket member 61 is formed in a generally rectangular shape as shown in FIG. 3 and is disposed along a rear surface 16b of the muffler 16 as shown in FIG. 5.

The regulator 47 is fixed to a rear surface 65a of the bracket member 61 by means of bolts 81 and nuts 82 (see FIG. 5). The regulator 47 communicates with the mixer 48 via a second fuel gas flow passage 68.

With the mounting plate section 65 disposed along the rear surface 16b of the muffler 16, the heat of the muffler 16 can be transmitted from the rear surface 16b to the mounting plate section 65. Further, the heat of the exhaust gas is transmitted to the mounting plate section 65 via the muffler mounting section 66 and vaporizing plate section 64.

Thus, with the regulator 47 mounted to the mounting plate section 65 of the bracket member 61, the regulator 47 can be appropriately kept warm by the heat accumulated in the bracket member 61.

Figure 8A:
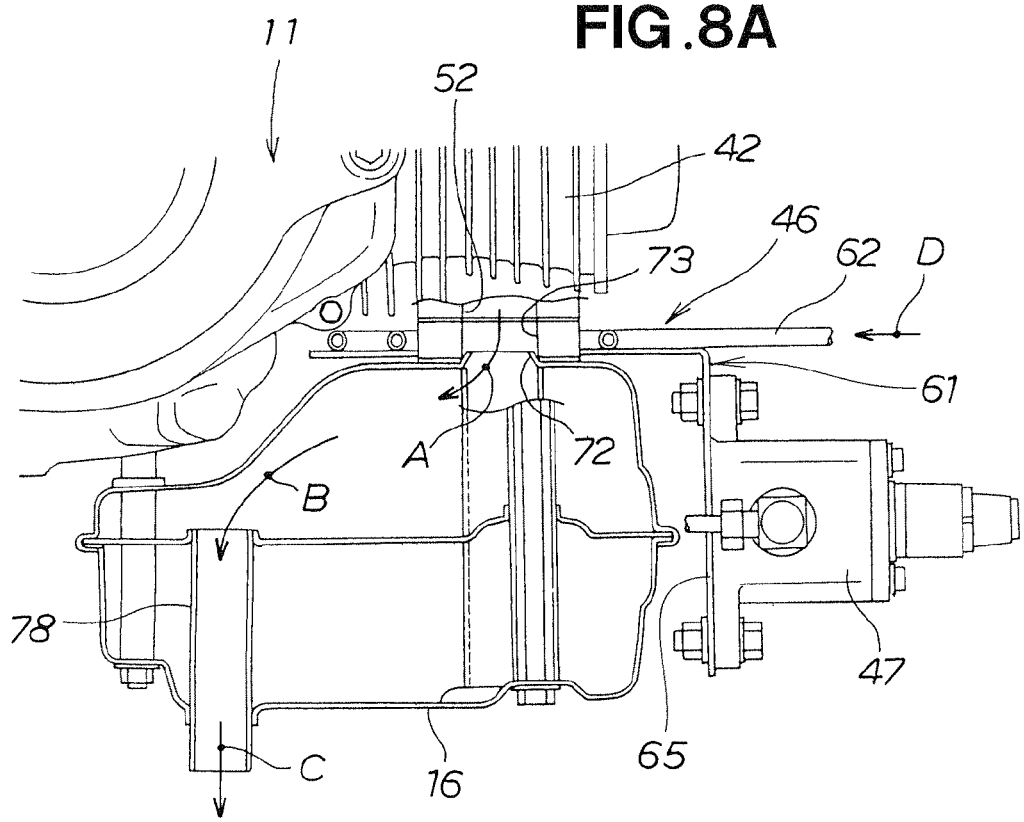
FIGS. 8A and 8B are views explanatory of how liquid fuel gas is led to the vaporizer device in the gas-engine-mounted working machine of the present invention.

Next, with reference to FIGS. 8 and 9, a description will be given about an example manner in which the liquid fuel gas is vaporized by the vaporizer device 46. FIGS. 8A and 8B are explanatory of how the liquid fuel gas is led to the vaporizer device 46 in the instant embodiment.

The liquid fuel gas led out from the cassette gas canister 18 is first sent to the first fuel gas flow passage 62 and then to the vaporizer device 46, as indicated by arrow D. The exhaust gas in the interior of the cylinder is led into the muffler 16 via the exhaust gas port 52, exhaust gas opening 73 and exhaust gas lead-in port 72, as indicated by arrow A in FIG. 8A.

The exhaust gas led into the muffler 16 is then directed to the exhaust pipe 78 as indicated by arrow B, via which the exhaust gas is discharged to the outside as indicated by arrow C.

Because the vaporizer device 46 is provided between the cylinder block 42 and the muffler 16, the heat of the cylinder block 42 and muffler 16 is transmitted to the vaporizer device 46.

Figure 8B:
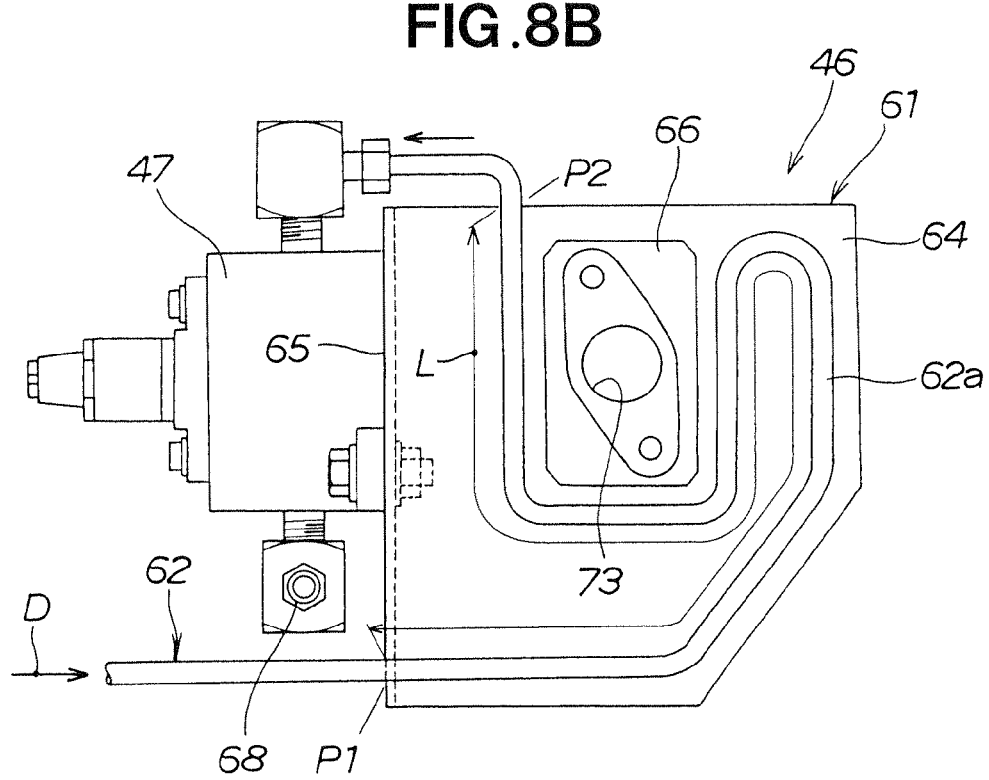

As shown in FIG. 8B, the liquid fuel gas is sent to the vaporizing fuel gas flow passage 62a of the vaporizer device 46. Because the vaporizing fuel gas flow passage 62a is brazed to the vaporizing plate section 64 in the meandering configuration, the vaporizing fuel gas flow passage 62a has a sufficiently great overall length L. Thus, it takes a relatively long time for the liquid fuel gas to be led from a lead-in position P1 to a lead-out position P2 of the vaporizing fuel gas flow passage 62a.

Figure 9:
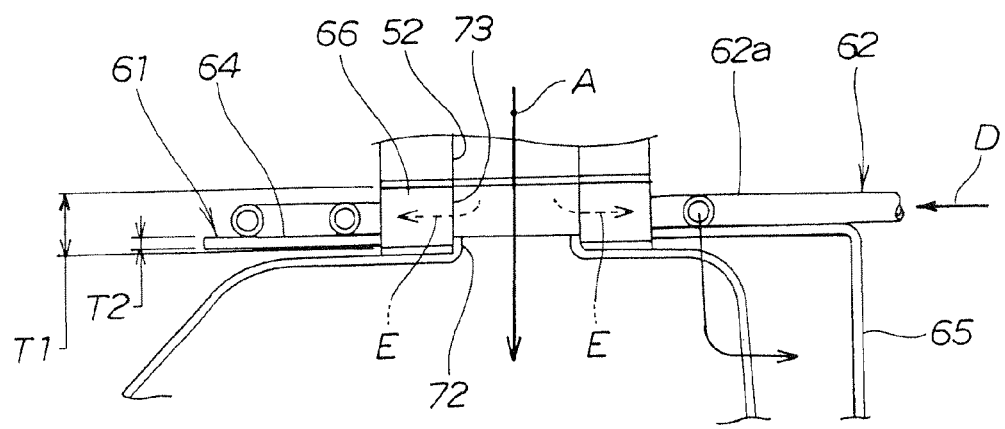
FIG. 9 is a view explanatory of how the liquid fuel gas is vaporized by the vaporizer device in the gas-engine-mounted working machine of the present invention.

FIG. 9 is explanatory of how the liquid fuel gas is vaporized by the vaporizer device 46 in the instant embodiment. The exhaust gas in the interior of the cylinder is led into the muffler 16 via the exhaust gas port 52, exhaust gas opening 73 and exhaust gas lead-in port 72, as indicated by arrow A in FIG. 9. As the exhaust gas passes through the exhaust gas opening 73, the heat of the exhaust gas is transmitted to and accumulated in the bracket member 61, as indicated by arrow E. More specifically, the heat of the exhaust gas is transmitted to the vaporizing plate section 64 and mounting plate section 65 of the bracket member 61 via the muffler mounting section 66.

Namely, the heat of the cylinder block 42 and muffler 16 is transmitted to the vaporizer device 46, and the heat of the exhaust gas passing through the exhaust gas opening 73 is transmitted to the bracket member 61. In this way, the heat of the exhaust gas can be efficiently transmitted into the vaporizing fuel gas flow passage 62a.

In addition, because the meandering vaporizing fuel gas flow passage 62a has a sufficiently great overall length L, the heat of the liquid fuel gas can be retained in the vaporizing fuel gas flow passage 62a for a relatively long time. Thus, the liquid fuel gas can be vaporized efficiently using the heat accumulated in the bracket member 61, which thereby achieves an enhanced liquid-fuel-gas vaporizing performance.

Further, because the thickness T1 of the muffler mounting section 66 is greater than the thickness T2 of the vaporizing plate section 64, the muffler mounting section 66 has an increased volume so that the heat absorption rate of the muffler mounting section 66 can be increased significantly.

Therefore, the heat of the exhaust gas can be accumulated in the bracket member 61 with an even further enhanced efficiency, so that the instant embodiment achieves an even further enhanced liquid-fuel-gas vaporizing performance. As a result, even when an ambient temperature is low, the instant embodiment allows the liquid fuel gas to be vaporized efficiently in a short time following activation of the gas engine 11, thereby achieving an enhanced starting performance.

Referring back to FIG. 8A, the regulator 47 is mounted to the mounting plate section 65 of the bracket member 61. The heat of the exhaust gas is transmitted to the mounting plate section 65 via the muffler mounting section 66 and vaporizing plate section 64, and the heat of the muffler 16 is transmitted from the rear surface 16b to the mounting plate section 65. Thus, the regulator 47 can be appropriately kept warm by the heat accumulated in the bracket member 61. In the aforementioned manner, the fuel gas, vaporized by the vaporizer device 46 and sent to the regulator 47, can be kept in a good vaporized condition in the regulator 47.

Whereas the preferred embodiment has been described above in relation to the case where the vaporizing fuel gas flow passage 62a is brazed to the inner side wall portion 64a of the vaporizing plate section 64, the present invention is not so limited; for example, the vaporizing fuel gas flow passage 62a may be fixed to the inner side wall portion 64a using other means, such as clips.

Further, whereas the preferred embodiment has been described above in relation to the case where the mounting bracket 61 is formed in a generally L shape, the mounting bracket 61 may be formed in any other suitable shape in correspondence with the construction, shape, design, etc. of the working machine 10.

Furthermore, whereas the preferred embodiment has been described above in relation to the case where the mounting plate section 65 is provided on the rear end of the bracket 61, the present invention is not so limited; for example, the mounting plate section 65 may be provided on the front end of the bracket 61, and the regulator 47 may be fixed to the mounting plate section 65 provided on the front end of the bracket 61.

Furthermore, whereas the preferred embodiment has been described above in relation to the case where the vaporizing fuel gas flow passage 62a is mounted to the vaporizing plate section 64 in the meandering configuration, the vaporizing fuel gas flow passage 62a may be provided so as to surround the muffler mounting section 66 in any other suitable manner; for example, it may be would around the muffler mounting section 66 in a coil configuration.

The present invention is well suited for application to gas-engine-mounted working machines including a gas engine supplied with fuel from a cassette gas canister.

Obviously, various minor changes and modifications of the present invention are possible in light of the above teaching. It is therefore to be understood that within the scope of the appended claims the invention may be practiced otherwise than as specifically described.

What is claimed is:

1. A gas engine supplied with fuel gas from a cassette gas canister, comprising:
  a cylinder;
  a muffler;
  a vaporizer device comprising a bracket member and a fuel gas flow passage, the vaporizer device provided between the cylinder and the muffler for vaporizing liquid fuel gas led out from the cassette gas canister through the fuel flow passage, said gas engine being driven by the fuel gas vaporized by said vaporizer device; and a regulator mounted to the bracket member, wherein heat from the bracket member keeps the fuel gas in the regulator vaporized at a predetermined constant gas pressure.

2. The gas engine of claim 1, wherein said bracket member has an exhaust gas opening for leading exhaust gas from an interior of the cylinder to the muffler, and said fuel gas flow passage provides fluid communication between the liquid fuel gas in the cassette gas canister and the cylinder.

3. The gas engine of claim 2, wherein, of said bracket member, a section defining and surrounding the exhaust gas opening has a greater thickness than a remaining section of said bracket member.

4. The gas engine of claim 2, further comprising:

a mixer, wherein the regulator supplies vaporized fuel gas at the predetermined constant gas pressure to the mixer through a second fuel gas flow passage.

5. The gas engine of claim 2, wherein the fuel gas flow passage is provided in a configuration meandering along a surface of said bracket member and around the exhaust gas opening.

6. A working machine including a gas engine supplied with fuel gas from a cassette gas canister, the gas engine comprising:

a cylinder;

a muffler;

a vaporizer device comprising a bracket member and a fuel flow passage, the vaporizer device provided between the cylinder and the muffler for vaporizing liquid fuel gas led out from the cassette gas canister through the fuel flow passage, said gas engine being driven by the fuel gas vaporized by said vaporizer device; and a regulator mounted to the bracket member, wherein heat is transferred directly from the bracket member to the regulator for keeping the fuel gas in the regulator vaporized at a predetermined constant gas pressure.

7. The gas engine of claim 3, wherein the muffler is mounted to the thicker section of the bracket member defining and surrounding the exhaust gas opening.

8. The gas engine of claim 1, wherein the bracket member comprises a vaporizing plate section and a mounting plate section, the vaporizing plate section being oriented between the cylinder and the muffler, and the mounting plate section being oriented between the muffler and the regulator.

9. The gas engine of claim 6, wherein the bracket member comprises a vaporizing plate section and a mounting plate section, the vaporizing plate section being oriented between the cylinder and the muffler, and the mounting plate section being oriented between the muffler and the regulator.

* * * * *